United States Patent
Joly

(10) Patent No.: US 7,043,684 B2
(45) Date of Patent: May 9, 2006

(54) METHOD FOR THE SYNCHRONIZATION OF TWO DIGITAL DATA FLOWS WITH IDENTICAL CONTENT

(75) Inventor: Alexandre Joly, La Motte Servolex (FR)

(73) Assignee: Telediffusion de France, Paris (FR)

( * ) Notice: Subject to any disclaimer, the term of this patent is extended or adjusted under 35 U.S.C. 154(b) by 0 days.

(21) Appl. No.: 10/502,379

(22) PCT Filed: Jan. 23, 2003

(86) PCT No.: PCT/FR03/00224

§ 371 (c)(1),
(2), (4) Date: Mar. 4, 2005

(87) PCT Pub. No.: WO03/063514

PCT Pub. Date: Jul. 31, 2003

(65) Prior Publication Data

US 2005/0166101 A1    Jul. 28, 2005

(30) Foreign Application Priority Data

Jan. 24, 2002    (FR) .................................. 02 00872

(51) Int. Cl.
*H03M 13/00*    (2006.01)
*G06F 11/00*    (2006.01)

(52) U.S. Cl. ..................... 714/814; 714/816
(58) Field of Classification Search ...................... None
See application file for complete search history.

(56) References Cited

U.S. PATENT DOCUMENTS

| | | | |
|---|---|---|---|
| 5,596,364 A | | 1/1997 | Wolf |
| 5,654,987 A | * | 8/1997 | Nakamura ................. 375/355 |
| 5,805,619 A | * | 9/1998 | Gardner et al. ............ 714/814 |
| 5,894,324 A | | 4/1999 | Overton |
| 6,002,836 A | * | 12/1999 | Inoue et al. .................. 386/95 |
| 6,092,040 A | | 7/2000 | Voran |

FOREIGN PATENT DOCUMENTS

| | | |
|---|---|---|
| EP | 0 838 960 A | 4/1998 |
| FR | 2 769 453 A | 4/1999 |
| FR | 2 795 578 A | 12/2000 |

* cited by examiner

*Primary Examiner*—Christine T. Tu
(74) *Attorney, Agent, or Firm*—Alston & Bird LLP

(57) ABSTRACT

The invention relates to a method of synchronizing two digital data streams with the same content, the method comprising the steps of:

a) generating at given intervals for each of the two digital data streams $S_1$ and $S_2$ at least two characteristic numbers expressing at least one parameter characteristic of their content;

b) generating from said numbers points $D_1$ and $D_2$ for each of the two streams $S_1$ and $S_2$ representing at least one of said characteristic parameters in a space of at least two dimensions, the points $D_1$ corresponding to the stream $S_1$ and the points D2 corresponding to the stream S2 that are situated in a time period T defining trajectories representative of the data streams $S_1$ and $S_2$ to be synchronized;

c) shifting the time periods of duration T assigned to the digital data streams $S_1$ and $S_2$ relative to each other by calculating a criterion of superposition of said trajectories having an optimum value representing the required synchronization;

d) choosing the shift between the time periods corresponding to said optimum value as a value representative of the synchronization.

26 Claims, 7 Drawing Sheets

METHOD FOR THE SYNCHRONIZATION OF TWO DIGITAL DATA FLOWS WITH IDENTICAL CONTENT

The invention relates to a method of synchronizing two digital data streams with the same content, for example a reference stream transmitted by a broadcasting system and the received stream, which may be degraded, the method being usable in particular to evaluate transmission quality.

BACKGROUND OF THE INVENTION

The introduction of digital technology into the field of broadcasting audiovisual signals has opened up new prospects and means that users may be offered more services.

The signals are modified during the various stages of broadcasting them because technical constraints imposed, for example in terms of bit rate or bandwidth, cause characteristic deterioration during difficult transmission conditions.

To be able to provide a quality assured service, it is necessary to develop tools and instruments for measuring the quality of the signals and, where applicable, for estimating the magnitude of the deterioration that has occurred. Many measuring methods have been developed for this purpose. Most of them are based on comparing the signal present at the input of the system under test, which is called the reference signal, with the signal obtained at the output of the system, which is called the degraded signal. Certain "reduced reference" methods compare numbers calculated for the reference signal and for the degraded signal instead of using the signal samples directly. In both cases, in order to evaluate quality by means of a comparison technique, it is necessary to synchronize the signals in time.

FIG. 1 depicts the general principle of these methods.

Although synchronization of the signals may be easily achieved in simulation or when the system under test is small, for example a coder-decoder (codec), and not geographically distributed, this is not the case in a complex system, in particular in the situation of monitoring a broadcast network. Thus the synchronization step of quality measuring algorithms is often critical.

In addition to applications for measuring quality in a broadcast network, the method described herein is applicable whenever temporal synchronization between two audio and/or video signals is required, in particular in the context of a distributed and extended system.

Various techniques may be used to synchronize digital signals in time. The objective is to establish a correspondence between a portion of the degraded signal $S_D$ and a portion of the reference signal $S_R$. FIG. 2 depicts this in the case of two audio signals. The problem is to determine a shift DEC that will synchronize the signals.

In the case of an audio signal, the portion (or element) for which a correspondence has to be established is a time window, i.e. a period of the signal with an arbitrary duration T.

The existing methods may be divided into three classes:

Correlation approach in the time domain: This is the most usual approach and consists in comparing samples of the two audio signals $S_R$ and $S_D$ to be synchronized, based on their content. Thus the normalized intercorrelation function between $S_R$ and $S_D$, for example, looks for the maximum resemblance over a given time period T, for example plus or minus 60 ms, i.e. a total period of 120 ms. The accuracy of synchronization obtained is potentially to the nearest sample.

Correlation approach in the time domain using marker signals: methods that use this principle seek to overcome the necessity for significant variations in the signal. To this end, a specific marker signal designed to allow robust synchronization is inserted into the audio signal $S_R$. Thus exactly the same intercorrelation method may be applied to the marker signals extracted from the signals $S_R$ and $S_D$ to be synchronized, which in theory allows robust synchronization regardless of the content of the audio signal.

In order to use this method, the marker signal must be inserted in such a way that the modification of the content of the audio signal is as imperceptible as possible. Several techniques may be used to insert marker signals or other specific patterns, including "watermarking".

Synchronization using temporal markers: methods of this class are usable only if the signals are associated with temporal markers. Thus the method relies on identifying, for each marker of the reference signal, the nearest marker in the series of markers associated with the degraded signal.

A powerful signal synchronization method is characterized by a compromise between:

its accuracy, i.e. the maximum error that occurs on synchronizing two signals (in particular, the method may be sensitive to the content of the signals), its calculation complexity, and finally, the volume of data necessary for effecting the synchronization.

The main drawback of the techniques most usually employed (using the correlation approach referred to above) is the calculation power that is necessary, which becomes very high as the search period T increases (see FIG. 2). Another major drawback is the necessity for the content to evolve significantly and continuously. Depending on the type of signals analyzed, this is not always achieved. The content of the signals therefore has a direct influence on the performance of the method. Moreover, to utilize this type of approach on complete temporal signals, it is necessary to have both the signals $S_R$ and $S_D$ available at the comparison point; this is a very severe constraint that is impossible to satisfy in some applications, such as monitoring an operational broadcasting network.

A feature of the second approach (using correlation with marker signals) is the modification of the content of the audio signal resulting from inserting the marker signals, with no guarantee as to how this will impact on quality; the measurement method therefore influences the measurement itself. Regardless of the performance achieved in terms of synchronizing the two signals, this approach is not always suitable for a real quality evaluation application.

Finally, the major drawback of synchronization using temporal markers is the necessity to provide the temporal markers. Because the accuracy of the temporal markers is not always satisfactory, only a few applications are able to use a technique of this kind.

In the context of broadcast network monitoring, and because of the multiple constraints that apply to the signals transported and the multiple equipments the signals pass through (coders, multiplexers, transmultiplexers, decoders, etc.), there is no strict relationship between the audio signals and the temporal markers. Thus this solution does not achieve the necessary accuracy for a quality measuring application using a reference.

OBJECTS AND SUMMARY OF THE INVENTION

An object of the present invention is to define a method of achieving synchronization with a chosen level of accuracy, of lower complexity than existing methods, and combining the advantages of several approaches. "Coarse" synchronization in accordance with the invention delimits an error range whose duration is compatible with the subsequent use of standard "fine" synchronization methods if extreme accuracy is required.

The novelty of the proposed method is that it achieves synchronization on the basis of at least one characteristic parameter that is calculated from the signals $S_D$ and $S_R$ and defines a multidimensional trajectory, from which the synchronization of the signals themselves is deduced. Because this method uses the temporal content of the signals, the content must vary continuously to ensure optimum synchronization, as in the prior art temporal correlation methods. The advantage of the proposed method is that it achieves correlation using a multidimensional trajectory obtained in particular by combining a plurality of characteristic parameters, which makes it more reliable than the prior art methods.

A fundamental advantage of the method proposed by the invention is that it necessitates only a small quantity of data to achieve synchronization, which is highly beneficial in the context of broadcast network monitoring. In fact, in this context, it is generally not possible to have the two complete signals $S_R$ and $S_D$ available at the same location. Consequently, it is not possible to use the standard temporal correlation approach. Moreover, in the context of a quality measurement application, the second approach using correlation with marker signals is not easily applicable because it impacts on the quality of the signals. In contrast to this, the synchronization method of the invention is compatible with quality measurement techniques based on comparing parameters calculated from the signals. The data representative of the characteristic parameter(s) is usually conveyed to the comparison points over a digital link. This digital link advantageously uses the same transmission channel as the audio signal; alternatively, a dedicated digital link may be used. In one particular embodiment, used in a quality measurement application, the data used to achieve synchronization is obtained from one or more quality measurement parameters. Moreover, coarse synchronization is obtained from data D1 and D2 calculated at intervals of $\Delta$=1024 audio samples. Fine synchronization may be obtained from data D1 calculated at intervals of $\Delta$=1024 audio samples and data D2 calculated at intervals of $r<\Delta$, for example r=32 audio samples. Thus in this case the method obtains fine synchronization that is 32 times more accurate than the quality measurement parameter transmission interval.

The method therefore integrates naturally into a digital television quality monitoring system in an operational broadcast network. However, it is applicable wherever temporal synchronization between two signals is required.

Thus the proposed method achieves synchronization with an accuracy that may be chosen to obtain a very small range of uncertainty. It advantageously uses at least some of the parameters already calculated to evaluate the quality of the signal. The ability to start from an extended search period is also beneficial, especially as the robustness of synchronization increases with the duration of the starting period.

The proposed method therefore does not impose the use of temporal markers external to the audio signals. The signal to be synchronized does not need to be modified either, which is important in a quality measurement application.

Thus the invention provides a method of synchronizing two digital data streams with the same content, the method comprising the steps of:

a) generating at given intervals for each of the two digital data streams $S_1$ and $S_2$ at least two characteristic numbers expressing at least one parameter characteristic of their content;

b) generating from said numbers points $D_1$ and $D_2$ associated with each of said streams and representing at least one of said characteristic parameters in a space of at least two dimensions, the points $D_1$ and the points D2 that are situated in a time period T defining trajectories representative of the data streams $S_1$ and $S_2$ to be synchronized;

c) shifting the time periods of duration T assigned to the digital data streams $S_1$ and $S_2$ relative to each other by calculating a criterion of superposition of said trajectories having an optimum value representing the required synchronization;

d) choosing the shift between the time periods corresponding to said optimum value as a value representative of the synchronization.

Advantageously in the method, one of the digital data streams is a reference stream $S_1$, the other data stream is a stream $S_2$ received via a transmission system, the numbers characteristic of the reference stream $S_1$ are transmitted therewith, and the numbers characteristic of the received stream $S_2$ are calculated in the receiver.

In a first variant of the method, the step c) entails:

c1) calculating a distance D between a first trajectory represented by the points $D_1$ belonging to a first time period of duration T and a second trajectory represented by the points $D_2$ belonging to a second time period of duration T, said distance D constituting said superposition criterion; and c2) shifting said first and second time periods of duration T relative to each other until a minimum value is obtained for the distance D that constitutes said The distance D may an arithmetic mean of the distances d, for example the Euclidean distances, between corresponding points $D_1$, $D_2$ of the two trajectories.

In a second variant of the method, the step c) entails:

c1) calculating a correlation function between corresponding points $D_1$, $D_2$ on the two trajectories, said correlation function constituting said superposition criterion; and c2) shifting said first and second time periods of duration T relative to each other until a minimum value of the correlation function is obtained that constitutes said optimum value.

In a third variant of the method, the step c) entails:

c1) converting each trajectory into a series of angles between successive segments defined by the points of the trajectory; and c2) shifting said first and second time periods of duration T relative to each other until a minimum value is obtained for the differences between the values of angles obtained for homologous segments of the two trajectories, said minimum value constituting said optimum value.

In the method, the step c) may entail:

c1) converting the two trajectories into a series of areas intercepted by successive segments defined by the points of said trajectories, the total intercepted area constituting said superposition criterion; and c2) shifting the time periods of duration T relative to each other until a minimum value is obtained of said total intercepted area, which minimum value constitutes said optimum value.

To make synchronization more accurate, one of said given intervals may be equal to $\Delta$ for one of the data streams and equal to $r<\Delta$ for the other data stream.

In the method, the generation of said characteristic numbers for a reference audio data stream and for a transmitted audio data stream may comprise the following steps:

a) calculating for each time window the spectral power density of the audio stream and applying to it a filter representative of the attenuation of the inner and middle ear to obtain a filtered spectral density;

b) calculating individual excitations from the filtered spectral density using the frequency spreading function in the basilar scale;

c) determining the compressed loudness from said individual excitations using a function modeling the non-linear frequency sensitivity of the ear, to obtain basilar components; and d) separating the basilar components into n classes, for example where $n \leq 5$, and preferably into three classes, and calculating for each class a number C representing the sum of the frequencies of that class, the characteristic numbers consisting of the numbers C. Alternatively there are $n'<n$ characteristic numbers generated from said numbers C. The value chosen for n is much lower than the number of samples, for example 0.01 times that number.

In the method, the generation of a characteristic number for a reference audio data stream and for a transmitted audio data stream comprises the following steps:

a) calculating N coefficients of a prediction filter by autoregressive modeling; and b) determining in each temporal window the maximum value of the residue as the difference between the signal predicted by means of the prediction filter and the audio signal, said maximum prediction residue value constituting one of said characteristic numbers.

In the method, the generation of said characteristic numbers for a reference audio data stream and for a transmitted audio data stream comprises the following steps:

a) calculating for each time window the spectral power density of the audio stream and applying to it a filter representative of the attenuation of the inner and middle ear to obtain a frequency spreading function in the basilar scale;

b) calculating individual excitations from the frequency spreading function in the basilar scale;

c) obtaining the compressed loudness from said individual excitations using a function modeling the non-linear frequency sensitivity of the ear, to obtain basilar components;

d) calculating from said basilar components N' prediction coefficients of a prediction filter by autoregressive modeling; and e) generating at least one characteristic number for each time window from at least one of the N' prediction coefficients.

The characteristic numbers may consist of 1 to 10 of said prediction coefficients and preferably 2 to 5 of said coefficients.

One characteristic number for an audio signal may be the instantaneous power and/or the spectral power density and/or the bandwidth.

One characteristic number for a video signal may be the continuous coefficient of the transformation by a linear and orthogonal transform of at least one portion of an image belonging to the data stream, said transformation being effected by blocks or globally, and/or the contrast of at least one area of the image, and/or the spatial activity SA of at least one area of an image or its temporal activity (defined by comparison with a previous image), and/or the average brightness of at least one area of an image.

The points may be generated from at least two characteristic numbers obtained from a single characteristic parameter.

Alternatively, the points may be generated from at least two characteristic numbers obtained from at least two characteristic audio and/or video parameters.

In the method, the data stream comprises video data and audio data and the method effects firstly video synchronization based on points $D_1$ and $D_2$ associated with at least one characteristic video parameter corresponding to said video stream and secondly audio synchronization based on points $D''1$ and $D''2$ associated with at least one characteristic audio parameter corresponding to said audio stream.

It may then include a step of determining the synchronization shift between the video stream and the audio stream as the difference between said shifts determined for the video stream and for the audio stream.

BRIEF DESCRIPTION OF THE DRAWINGS

Other features and advantages of the invention will become more apparent on reading the description with reference to the appended drawings, in which.

MORE DETAILED DESCRIPTION

Figure 1:
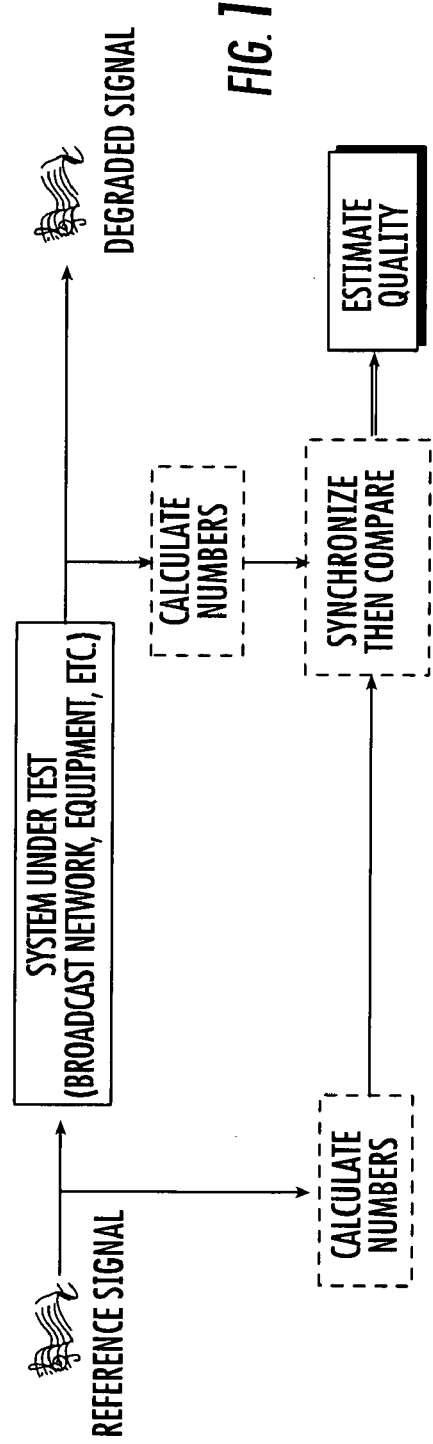
FIG. 1 shows the architecture of a prior art system for measuring the quality of an audio signal.
Figure 2:
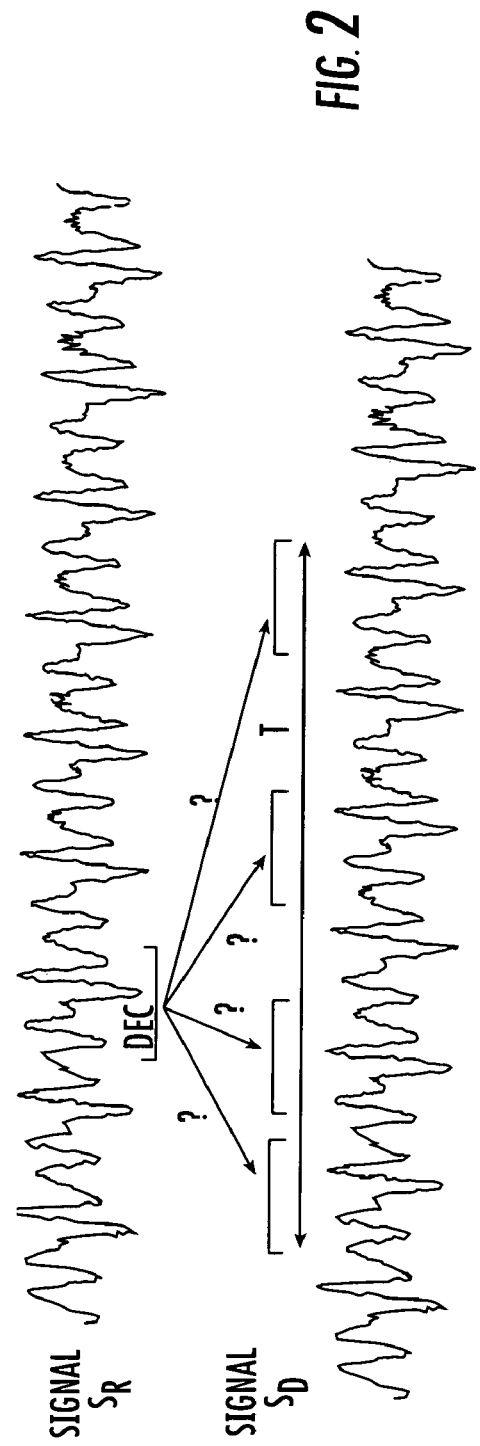
FIG. 2 depicts the audio signal synchronization problem.

The first step of the method calculates at least two characteristic numbers from one or more characteristic parameters over all of the time windows of the signals to be synchronized and over the required synchronization period; each number is therefore calculated at intervals $\Delta$ (see FIGS. 2 and 3), which yields $N=T/\Delta$ parameters. If possible, the number(s) must be simple to calculate, so as not to demand excessive calculation power. Each characteristic parameter may be of any kind and may be represented by a single number, for example. One characteristic parameter of the content of an audio signal is the bandwidth, for example.

Providing the parameters only at intervals $\Delta$ greatly reduces the quantity of data necessary to obtain synchronization from the reference signal $S_R$. However, the accuracy of the resulting synchronization is necessarily limited; the uncertainty with respect to an ideal synchronization, i.e. to the nearest signal sample, is $\pm\Delta/2$. If this uncertainty is too great, one alternative is to reduce the period $\Delta$; however, this modification is rarely possible since it calls into question the calculation of the characteristic number(s) and increases the quantity of data necessary for synchronization.

Figure 3:
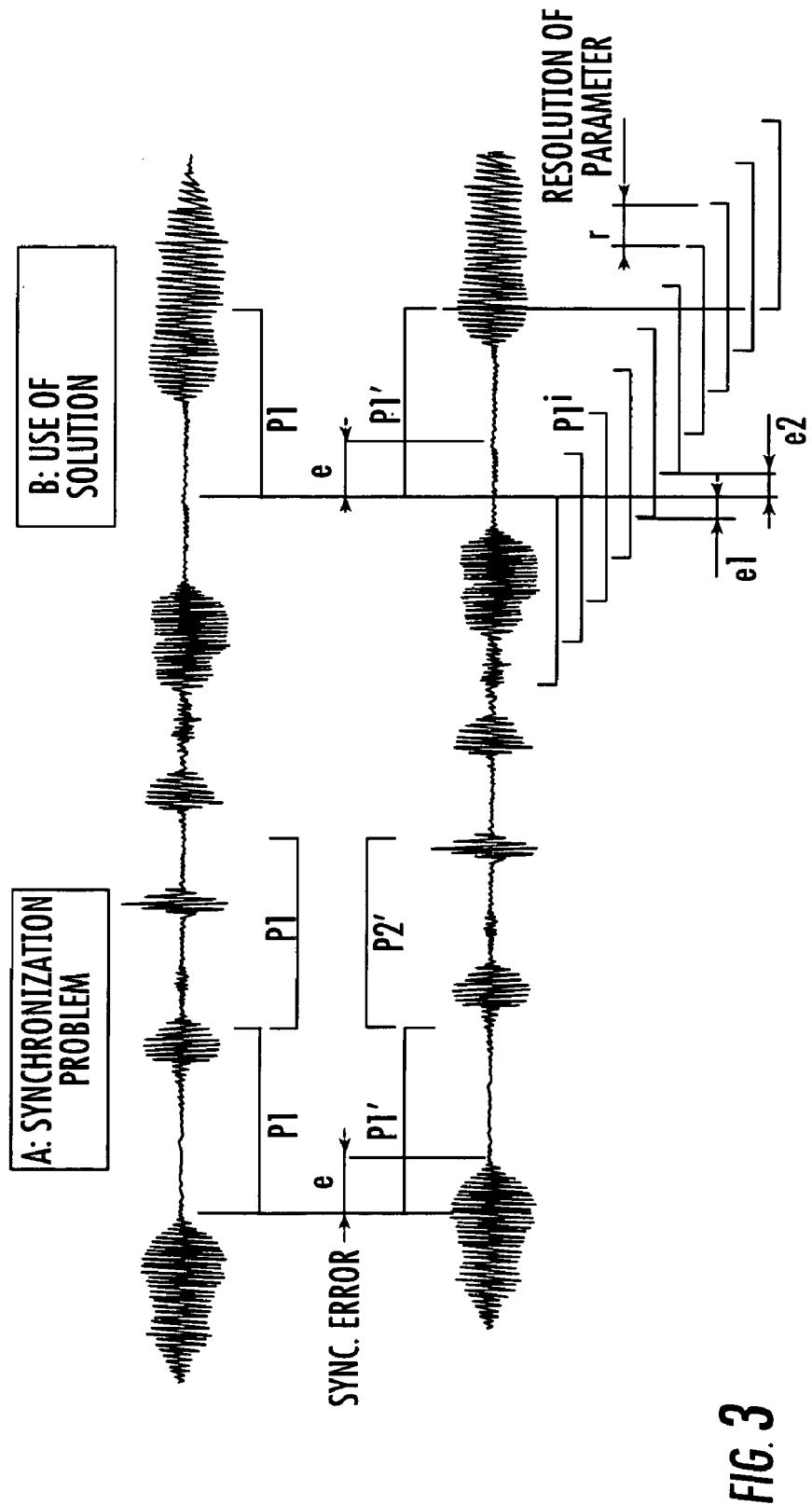
FIG. 3 shows an increase in synchronization accuracy that may be achieved in the context of the present invention.

In the particular embodiment in which the parameters are also used to evaluate quality by comparing the parameters $P_1$ and $P'_1$, any synchronization error exceeding the resolution $r_0$ of the parameter will prevent estimation of the deterioration introduced (this is Situation A in FIG. 3).

To obtain an arbitrary synchronization accuracy, with an uncertainty value r that may be less than $\Delta/2$, for example, without increasing the quantity of data extracted from the reference signal, the characteristic numbers may be calculated with a higher temporal resolution. For this purpose, the parameters are calculated at intervals $r<\Delta$ from the second signal to be synchronized (the "degraded" signal), which corresponds to $\Delta/r$ parameters $P_1^i$ for a parameter $P_1$. The calculation complexity increases from $T/\Delta$ to $T/r$ calculation windows, but only for the received signal. The situation B of FIG. 3 illustrates the method used. For example, r is a sub-multiple of $\Delta$.

Notation

T: synchronization search period (T is a multiple of $\Delta$);
$r_0$: maximum permitted synchronization error/uncertainty;
e: synchronization error;
$\Delta$: period of calculating the parameters from the signal;
$P_k$: parameter calculated from the first ("reference") signal $S_R$(k is a temporal index indicating to which calculation period $\Delta$ $P_k$ corresponds);
$P'_k$: parameter calculated from the second ("degraded") signal $S_D$(k is a temporal index indicating to which calculation period $\Delta$ $P_k$ corresponds);
$P'_k{}^i$: parameter calculated from the second ("degraded") signal $S_D$(k is a temporal index indicating to which calculation period $\Delta$ $P_k$ corresponds); and
i is a temporal subindex indicating a number of periods r from 1 to $\Delta/r$ within the period p.

Note: All durations correspond to an integer number of samples of the audio or video signal.

The second step processes the parameters to define one or more coordinates. A set of β coordinates is calculated for each set of parameters $P_k$ or $P'_k{}^i$ obtained over the window k of duration $\Delta$ corresponding to 1024 samples of the reference signal or the degraded signal, respectively, for example.

The prime aim of this step is to obtain pertinent coordinate values for carrying out synchronization, with given bounds and limits. Thus each coordinate is obtained from a combination of available characteristic numbers. Moreover, this step reduces the number of dimensions and therefore simplifies subsequent operations.

In one preferred embodiment, two coordinates must be obtained (β=2). For example, if two characteristic parameters are used, each of them may be used to determine a coordinate. Alternatively, more characteristic numbers may be used; processing may be carried out to provide fewer numbers, for example two coordinates, which are then interpreted as a projection from a space with as many dimensions as there are characteristic numbers to a space with two coordinates, for example.

Figure 4:
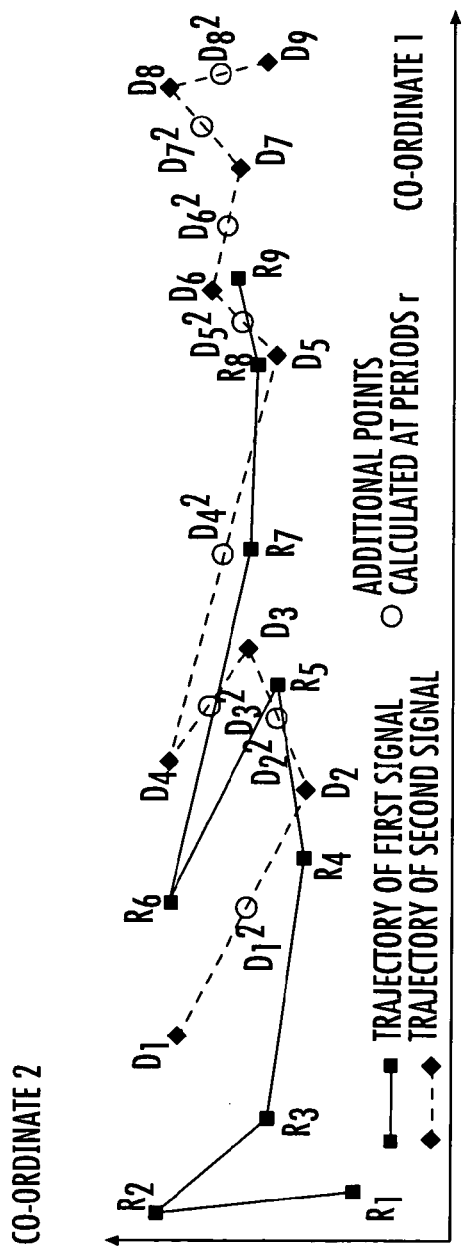
FIG. 4 depicts an example of two bidimensional trajectories of audio signals to be synchronized in a situation where $r=\Delta/2$.

The third step constructs the trajectory (see FIG. 4). The trajectory defines a signature of a segment of the audio signal over the duration T by means of a series of points in a space with as many dimensions as there are coordinates. The use of a space with two or more dimensions enables a particular trajectory to be constructed, achieving high reliability and high accuracy of synchronization.

After these three steps, synchronizing the signals amounts to synchronizing two trajectories (or curves parametered by time) in a space of two or more dimensions:

The first trajectory is defined by points $R_k$ obtained from significant numbers $P_k$ calculated at intervals $\Delta$ over the time period T. There are $N=T/\Delta$ points $R_k$.

The second trajectory is defined by points $D_k=D_k{}^i$ obtained from significant numbers $P_k=P_k{}^i$ calculated at intervals $\Delta$ over the range T. There are $N'=N=T/\Delta$ points $D_k$.

If a period $r<\Delta$ is used to calculate the parameters $P'_k{}^i$, the trajectory is defined by the points $D_k{}^i$, of which there are $N'=T/r$.

To this end, a criterion of resemblance between two trajectories of N points (or of N and N' points) is used. The following methods are described by way of example:

The first method proposed minimizes a distance between the two trajectories.

The basic idea is to calculate a distance over a portion of the trajectory. An appropriate portion of each trajectory is selected as a function of the maximum range of desynchronization of the curves corresponding to the audio or video signals.

Over these portions, a cumulative total Diff of the distances d between the peaks $R_k$ and $D_{k+delta}$ or $D_{k+delta}{}^i$ of the curves is calculated from equations (1) and (2) below, respectively, by applying successive shifts delta, in order to find the shift minimizing the distance Diff between trajectories.

FIG. 4 depicts the calculation for one example, with points defined by two coordinates in a space with β=2 dimensions. For the "degraded" signal, the parameters are calculated at intervals $r=\Delta/2$, i.e. with twice the resolution of the first signal.

The distance Diff gives the distance between the two trajectories. The arithmetic mean of the peak to peak distances is preferred, but another distance calculation is equally applicable.

$$Diff(\text{delta}) = \alpha D \sqrt{\frac{1}{N} \sum_{k=1}^{N} [d(D_k, R_{k+delta})]}$$

where $\alpha D=1 \ldots \infty$, $N=T/\Delta$ and d(A,B) is the distance between two points or peaks. This distance d(A,B) may also have any value. In one particular embodiment, the Euclidean distance is used:

$$d(A,B) = \alpha d \sqrt{\sum_{j=1}^{\beta} (a_j - b_j)^{\alpha d}}$$

where $\alpha d=1 \ldots \infty$, $a_j$ and $b_j$ are the coordinates of the points A and B and β designates the number of coordinates of each point.

The shift delta giving the minimum distance Diff corresponds to resynchronization of the curves and consequently of the original signal. In this example (FIG. 4) the shift is 2, which is twice the initial parameter calculation period Δ. The synchronization range will therefore be from:

$$t + 2*\Delta - \frac{\Delta}{2} \text{ to } t + 2*\Delta + \frac{\Delta}{2} \quad (3)$$

The second criterion proposed is maximization of a correlation between the two trajectories.

This criterion works in a similar way to the preceding one, except that it maximizes the value Correl. Equations (1) and (2) are replaced by the following two equations:

$$\text{Correl(delta)} = \sum_{k=1}^{N} D_k * R_{k+delta} \quad (4)$$

in which the operator * denotes the scalar product defined as follows:

$$A*B = \frac{\sum_{k=1}^{N} a_j * b_j}{\sqrt{\sum_{k=1}^{N} a_j^2} \cdot \sqrt{\sum_{k=1}^{N} b_j^2}} \quad (5)$$

where $a_j$ and $b_j$ are the coordinates of the points A and B.

The following methods are particularly suitable for β=2 coordinates.

Other techniques make the method more robust in the presence of significant differences between the signals to be synchronized, for example caused by deterioration during broadcasting, namely:

distance between successive angles of the trajectories

Figure 5:
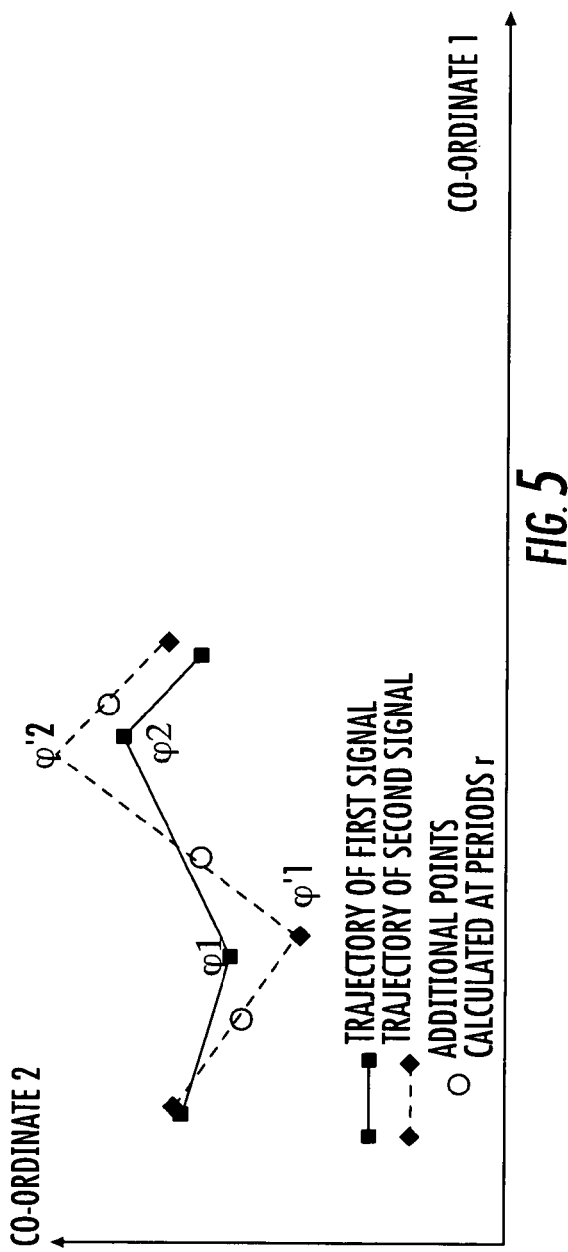
FIGS. 5 and 6 depict two variants of synchronization between two trajectories assigned to two data streams.

This method consists in transforming the two-dimensional trajectory into a series of angles between successive segments defined by the points of the trajectory. FIG. 5 shows the definition of the angles Δφ.

The criterion used for synchronizing the two trajectories is minimization of the following equation:

$$\text{Diff(delta)} = \sum_{k=1}^{N-1} |\varphi_k - \varphi_{k+delta}| \quad (6)$$

intercepted area between the two curves

Figure 6:
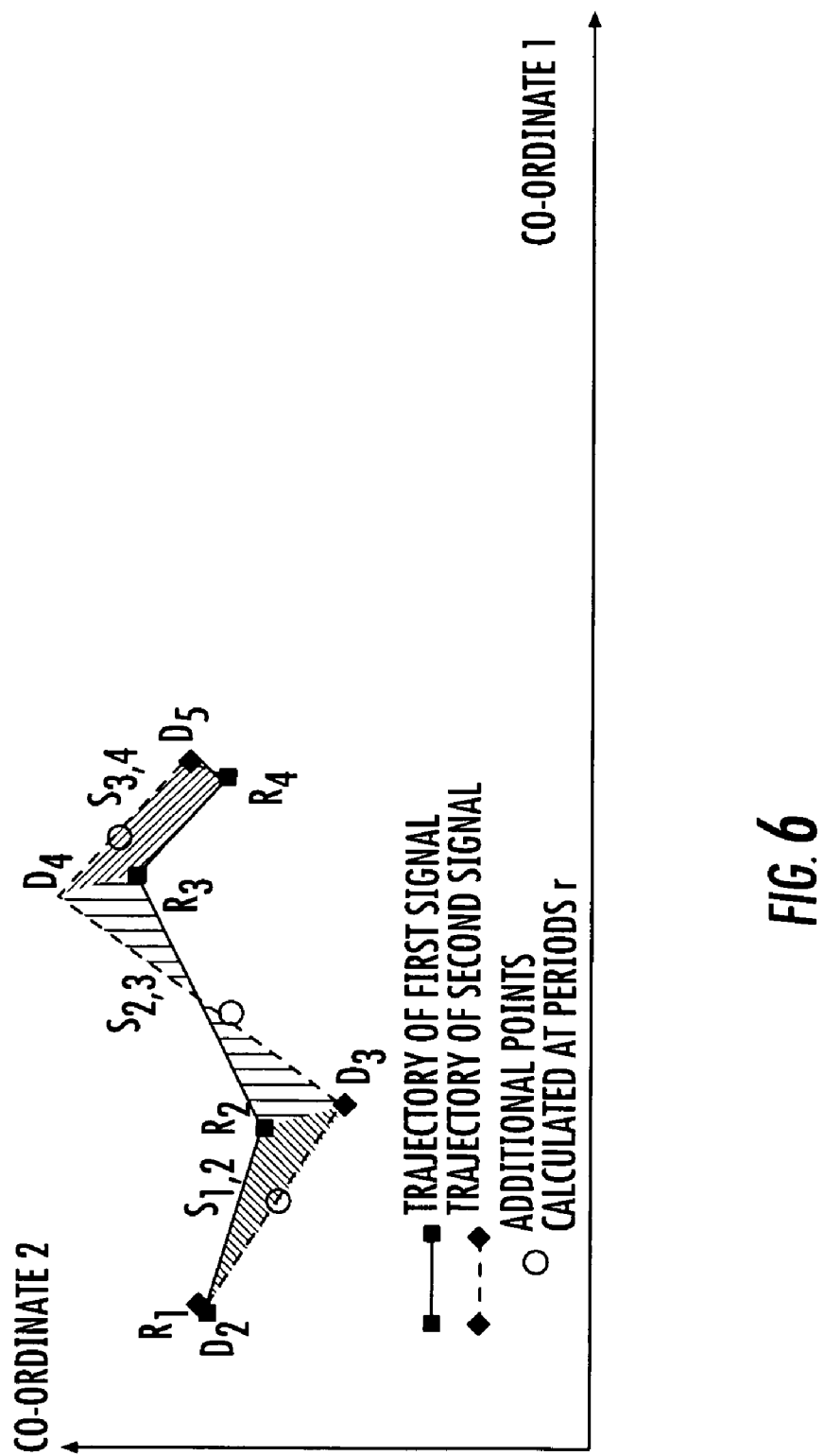

This method consists in transforming the two-dimensional trajectory into a series of areas intercepted by successive segments defined by the points of the trajectory. FIG. 6 shows the definition of the intercepted areas S.

The criterion used for synchronizing the two trajectories is minimization of the following equation:

$$S_{Total} = \text{sum } S \text{ Diff(delta)} = \sum_{k=1}^{N-1} |S_{k,k+delta}| \quad (7)$$

Finally, the simultaneous use of a plurality of criteria is possible. Once the value delta of the resynchronization between the two signals has been determined by one of the above methods, the two signals may be resynchronized by applying the shift delta to one of the signals. Synchronization is obtained to an accuracy determined by the rate at which the characteristic numbers are calculated.

Figure 7:
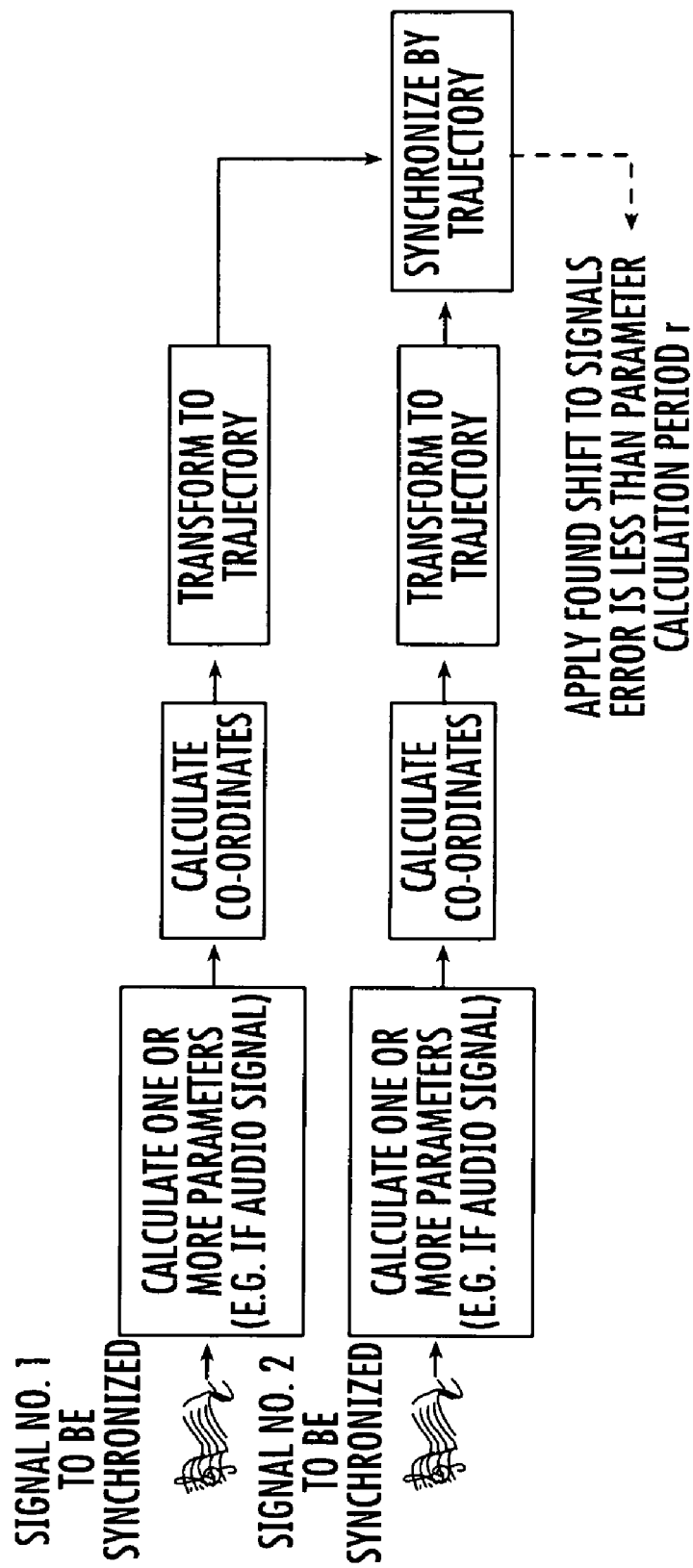
FIG. 7 is a flowchart of a trajectory-based synchronization method of the invention.

FIG. 7 is a flowchart of a synchronization method.

If the required accuracy is not achieved, i.e. if the synchronization is too "coarse" for the target application, there may be a final step to refine the preceding result.

A prior art procedure may be applied to the synchronization uncertainty range Δ or r, which is now sufficiently small for the complexity to be acceptable. For example, an approach based on correlation in the time domain may be used, preferably an approach that uses marker signals.

However, this step should be used only in certain specific instances because, in the quality measurement type of target application, refining the synchronization is generally not necessary since sufficient accuracy is achieved. Moreover, as explained above, the prior art techniques necessitate the availability of data on the signals that is not readily transportable in a complex and distributed system.

One particular embodiment of the invention relates to an application for monitoring audio quality in a digital television broadcast network. In this context, a major benefit of the invention is that it achieves synchronization using data used for evaluating quality, as this avoids or minimizes the need to transmit data specific to synchronization.

Diverse characteristic numbers for estimating the magnitude of the deterioration introduced on broadcasting the signal are calculated from the reference signal at the input of the network (this refers to "reduced reference" methods). The reference numbers $P_R$ are sent over a data channel to the quality measurement point, characteristic numbers $P_M$ are calculated from the degraded signal at the measurement point, and quality is estimated by comparing the parameters $P_R$ and $P_M$. They must be synchronized for this, on the basis of the characteristic parameter(s) used for the reference.

Quality is therefore estimated by comparing the parameters $P_R$ and $P_M$, which must be synchronized for this to be possible.

The principle of objective perceived measurements is based on converting a physical representation (sound pressure level, level, time and frequency) into a psychoacoustic representation (sound force, masking level, critical times and bands or barks) of two signals (the reference signal and the signal to be evaluated), in order to compare them. This conversion is effected by modeling the human auditory apparatus (generally by spectral analysis in the Barks domain followed by spreading phenomena).

The following embodiment of the method of the invention uses a perceived characteristic parameter known as the "perceived count error". The novelty of this parameter is that it establishes a measurement of the uniformity of a window in the audio signal. A sound signal whose frequency components are stable is considered to be uniform. Conversely, "perfect" noise corresponds to a signal that covers all the frequency bands uniformly (flat spectrum). This type of parameter may therefore be used to characterize the content of the signal. This capacity is reinforced by its perceived character, i.e. by taking account of characteristics of the human auditory apparatus known from psychoacoustics.

The steps applied to the reference signal and to the degraded signal to take account of psychoacoustics are as follows:

Windowing of the temporal signal in blocks and then, for each block, calculating the excitation induced by the signal using a hearing model. This representation of the signals takes account of psychoacoustic phenomena and supplies a histogram whose counts are basilar component values. Thus only the audible components of the signal need to be taken into account, i.e. only the useful information. Standard models may be used to obtain this excitation: attenuation of the external and middle ear, integration in physical bands and frequency masking. The time windows chosen are of approximately 42 ms duration (2048 points at 48 kHz), with a 50% overlap. This achieves a temporal resolution of the order of 21 ms.

Modeling entails a plurality of steps. In the first step, the attenuation filter of the external and middle ear is applied to the spectral power density obtained from the spectrum of the signal. This filter also takes account of an absolute hearing threshold. The concept of critical bands is modeled by conversion from a frequency scale to a basilar scale. The next step calculates individual excitations to take account of masking phenomena, using the spreading function in the basilar scale and non-linear addition. The final step uses a power function to obtain the compressed loudness for modeling the non-linear frequency sensitivity of the ear by a histogram comprising 109 basilar components.

The counts of the histogram obtained are then periodically vectored in three classes to obtain a representation along a trajectory that is used to visualize the evolution of the structure of the signals and for synchronization. This also yields a simple and concise characterization of the signal and thus provides a reference parameter (or characteristic parameter).

There are various strategies for fixing the limits of the three classes; the simplest divides the histogram into three areas of equal size. Thus the 109 basilar components, which represent 24 Barks, may be separated at the following indices:

$$IS_1 = 36 \text{ i.e. } z = \frac{24}{109} * 36 = 7.927 \text{ Barks} \quad (8)$$

$$IS_2 = 73 \text{ i.e. } z = \frac{24}{109} * 73 = 16.073 \text{ Barks} \quad (9)$$

The second strategy takes account of the BEERENDS scaling areas. This corresponds to compensation of the gain between the excitation of the reference signal and that of the signal under test by considering three areas in which the ear would perform this same operation. Thus the limits set are as follows:

$$IS_1 = 9 \text{ i.e. } z = \frac{24}{109} * 9 = 1.982 \text{ Barks} \quad (10)$$

$$IS_2 = 100 \text{ i.e. } z = \frac{24}{109} * 100 = 22.018 \text{ Barks} \quad (11)$$

The trajectory is then represented in a triangle known as the frequency triangle. For each block three counts $C_1$, $C_2$ and $C_3$ are obtained, and thus two Cartesian coordinates, conforming to the following equations:

$$X = C_1/N + \frac{C_2/N}{2} \quad (12)$$

$$Y = C_2/N * \sin(\pi/3) \quad (13)$$

where $C_1$ is the sum of the excitations for the high frequencies (components above $S_2$), $C_2$ is the count associated with the medium frequencies (components from $S_1$ to $S_2$), and $N = C_1 + C_2 + C_3$ is the total sum of the values of the components.

A point (X, Y) is therefore obtained for each temporal window of the signal. Each of the coordinates X and Y constitutes a characteristic number. Alternatively, $C_1$, $C_2$ and $C_3$ may be taken as characteristic numbers.

Figure 8:
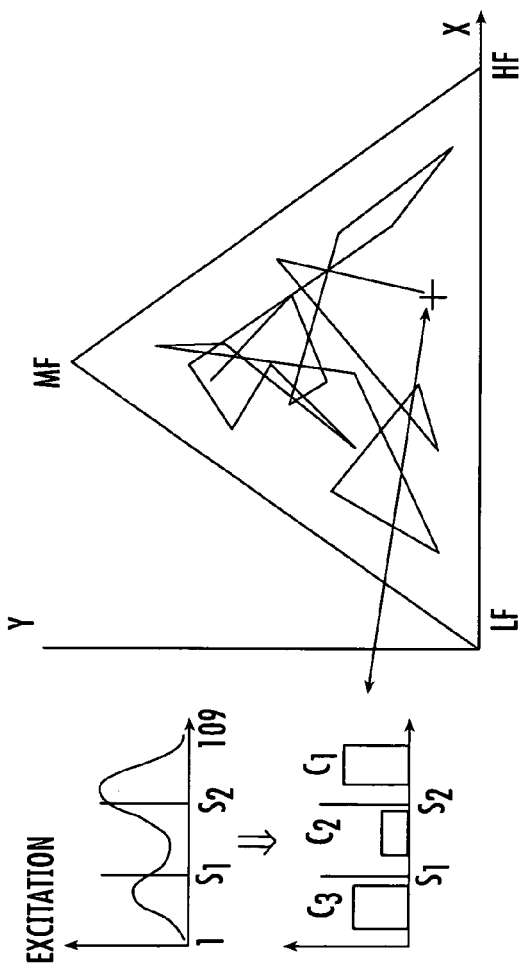
FIGS. 8 to 10 depict synchronization in accordance with the invention when the significant parameter is a perceived audio parameter, FIGS. 10a and 10b respectively depicting the situation before and after synchronization of two trajectories.

For a complete sequence, the associated representation is therefore a trajectory parametered by time, as shown in FIG. 8.

Of the various methods available for synchronizing the trajectories, the technique chosen by way of example is that based on minimizing the distance between points on the trajectories.

It is important to note that the calculation of the parameter for the synchronization used in this case remains complex, but that this parameter may also be used to estimate the quality of the signal. It must therefore be calculated anyway, and this is therefore not an additional calculation load at the time of the comparison, especially as the calculation relating to this parameter is effected locally only for the received digital stream.

Figure 9:
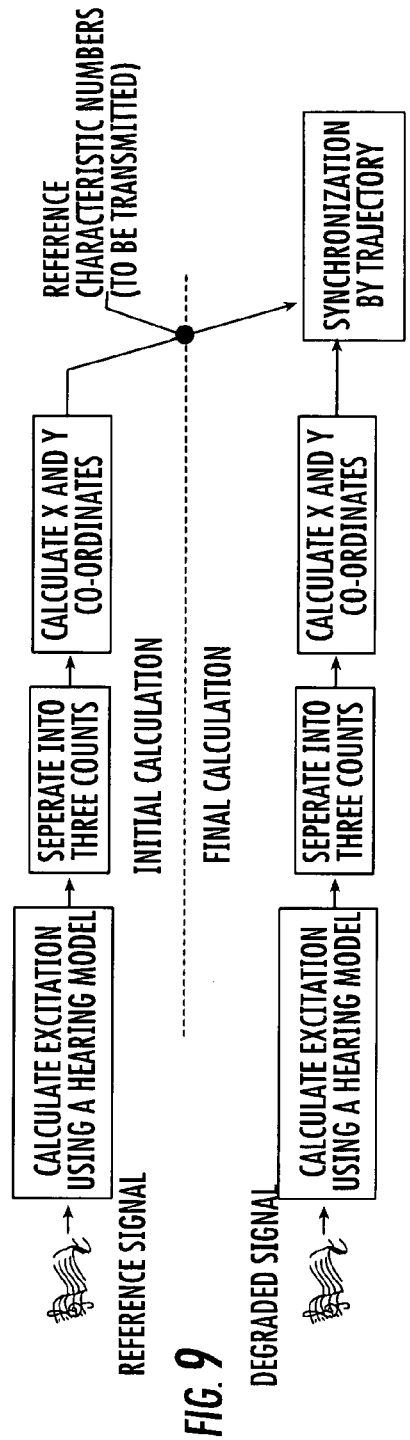

FIG. 9 summarizes the method used to synchronize the signals in the context of monitoring the quality of broadcast signals using the above characteristic parameter.

Figure 10:
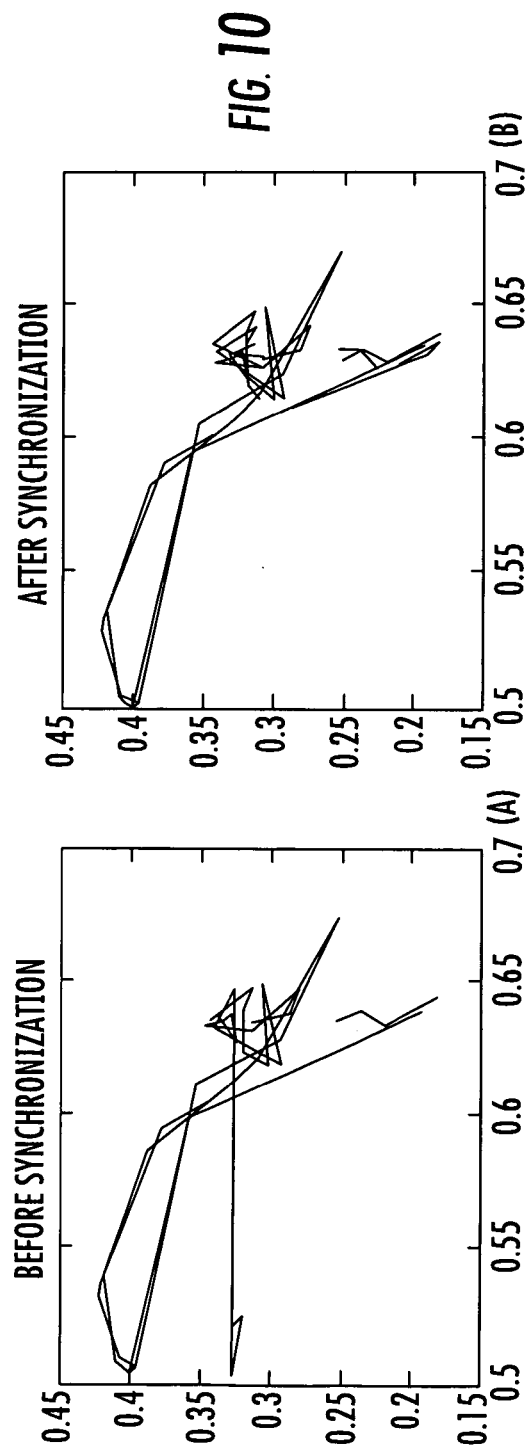

The following example illustrates the case of a reference file (R1) which is MPEG2 coded and decoded at 128 kbit/s, yielding a degraded file (R2). The resynchronization introduced is 6000 samples. The shift found is six windows, i.e. 6*1024=6144 samples. The error (144) is much less than the period (1024) of the characteristic parameter. FIGS. 10a and 10b show the trajectories before and after synchronization.

Before synchronization (FIG. 10a), there is no point to point correspondence between the two trajectories. After synchronization (FIG. 10b), the correspondence between the two trajectories is optimized in terms of the distance criterion (cf. equation (1)).

More refined synchronization is generally not needed, especially if the uncertainty resulting from the procedure explained here is less than the maximum synchronization error permitted by the quality measurement parameter. For more demanding quality parameters, the necessary resolution $r_0$ is of the order of 32 samples.

In FIG. 10a, the original range is of the order of 120 ms, i.e 5760 samples at 48 kHz. Using only the characteristic numbers available for the evaluation of quality (every 1024 samples, i.e. every Δ), a first synchronization is carried out with an uncertainty of 1024 samples, which is better by a factor of 5 compared to 5760, for a calculation power dedicated to very limited synchronization.

However, in a second step, for example, more frequent calculation of the quality parameters for the second (degraded) signal (r<Δ) enables the synchronization error to be further reduced to r samples, if required.

Another characteristic parameter uses autoregressive modeling of the signal.

The general principle of linear prediction is to model a signal as a combination of its past values. The basic idea is to calculate the N coefficients of a prediction filter by autoregressive (all pole) modeling. It is possible to obtain a predicted signal from the real signal using this adaptive filter. The prediction or residual errors are calculated from the difference between these two signals. The presence and the quantity of noise in a signal may be determined by analyzing these residues.

The magnitude of the modifications and defects introduced may be estimated by comparing the residues obtained for the reference signal and those calculated from the degraded signal.

Because there is no benefit in transmitting all of the residues if the bit rate of the reference is to be reduced, the reference to be transmitted corresponds to the maximum of the residues over a time window of given size.

Two methods of adapting the coefficients of the prediction filter are described hereinafter by way of example:

- The LEVINSON-DURBIN algorithm, which is described, for example, in "Traitement numerique du signal—Théorie et pratique" ["Digital signal processing—Theory and practice"] by M. BELLANGER, MASSON, 1987, pp. 393 to 395. To use this algorithm, an estimate is required of the autocorrelation of the signal over a set of No samples. This autocorrelation is used to solve the Yule-Walker system of equations and thus to obtain the coefficients of the prediction filter. Only the first N values of the autocorrelation function may be used, where N designates the order of the algorithm, i.e. the number of coefficients of the filter. The maximum prediction error is retained over a window comprising 1024 samples.
- The gradient algorithm, which is also described in the above-mentioned book by M. BELLANGER, for example, starting at page 371. The main drawback of the preceding parameter is the necessity, in the case of a DSP implementation, to store the No samples in order to estimate the autocorrelation, together with the coefficients of the filter, and then to calculate the residues. The second parameter avoids this by using another algorithm to calculate the coefficients of the filter, namely the gradient algorithm, which uses the error that has occurred to update the coefficients. The coefficients of the filter are modified in the direction of the gradient of the instantaneous quadratic error, with the opposite sign.

When the residues have been obtained from the difference between the predicted signal and the real signal, only the maximum of their absolute values over a time window of given size T is retained. The reference vector to be transmitted can therefore be reduced to a single number.

After transmission followed by synchronization, comparison consists in simply calculating the distance between the maxima of the reference and the degraded signal, for example using a difference method.

FIG. 5 summarizes the parameter calculation principle:

The main advantage of the two parameters is the bit rate necessary for transferring the reference. This reduces the reference to one real number for 1024 signal samples.

However, no account is taken of any psychoacoustic model.

Another characteristic parameter uses autoregressive modeling of the basilar excitation.

In contrast to the standard linear prediction method, this method takes account of psychoacoustic phenomena in order to obtain an evaluation of perceived quality. For this purpose, calculating the parameter entails modeling diverse hearing principles. Linear prediction models the signal as a combination of its past values. Analysis of the residues (or prediction errors) determines the presence of noise in a signal and estimates the noise. The major drawback of these techniques is that they take no account of psychoacoustic principles. Thus it is not possible to estimate the quantity of noise actually perceived.

The method uses the same general principle as standard linear prediction and additionally integrates psychoacoustic phenomena in order to adapt to the non-linear sensitivity of the human ear in terms of frequency (pitch) and intensity (loudness).

The spectrum of the signal is modified by means of a hearing model before calculating the linear prediction coefficients by autoregressive (all pole) modeling. The coefficients obtained in this way provide a simple way to model the signal taking account of psychoacoustics. It is these prediction coefficients that are sent and used as a reference for comparison with the degraded signal.

The first part of the calculation of this parameter models psychoacoustic principles using the standard hearing models. The second part calculates linear prediction coefficients. The final part compares the prediction coefficients calculated for the reference signal and those obtained from the degraded signal. The various steps of this method are therefore as follows:

- Time windowing of the signal followed by calculation of an internal representation of the signal by modeling psychoacoustic phenomena. This step corresponds to the calculation of the compressed loudness, which is in fact the excitation in the inner ear induced by the signal. This representation of the signal takes account of psychoacoustic phenomena and is obtained from the spectrum of the signal, using the standard form of modeling: attenuation of the external and middle ear, integration in critical bands, and frequency masking; this step of the calculation is identical to the parameter described above;
- Autoregressive modeling of the compressed loudness in order to obtain the coefficients of an RIF prediction filter, exactly as in standard linear prediction; the method used is that of autocorrelation by solving the Yule-Walker equations; the first step for obtaining the prediction coefficients is therefore calculating the autocorrelation of the signal.

It is possible to calculate the perceived autocorrelation of the signal using an inverse Fourier transform by considering the compressed loudness as a filtered spectral power.

One method of solving the Yule-Walker system of equations and thus of obtaining the coefficients of a prediction filter uses the Levinson-Durbin algorithm.

It is the prediction coefficients that constitute the reference vector to be sent to the comparison point. The transforms used for the final calculations on the degraded signal are the same as are used for the initial calculations applied to the reference signal.

- Estimating the deterioration by calculating a distance between the vectors from the reference and from the degraded signal. This compares coefficient vectors obtained for the reference and for the transmitted audio signal, enabling the deterioration caused by transmission to be estimated, using an appropriate number of coefficients. The higher this number, the more accurate the calculations, but the greater the bit rate necessary for transmitting the reference. A plurality of distances may be used to compare the coefficient vectors. The relative size of the coefficients may be taken into account, for example.

Figure 11:
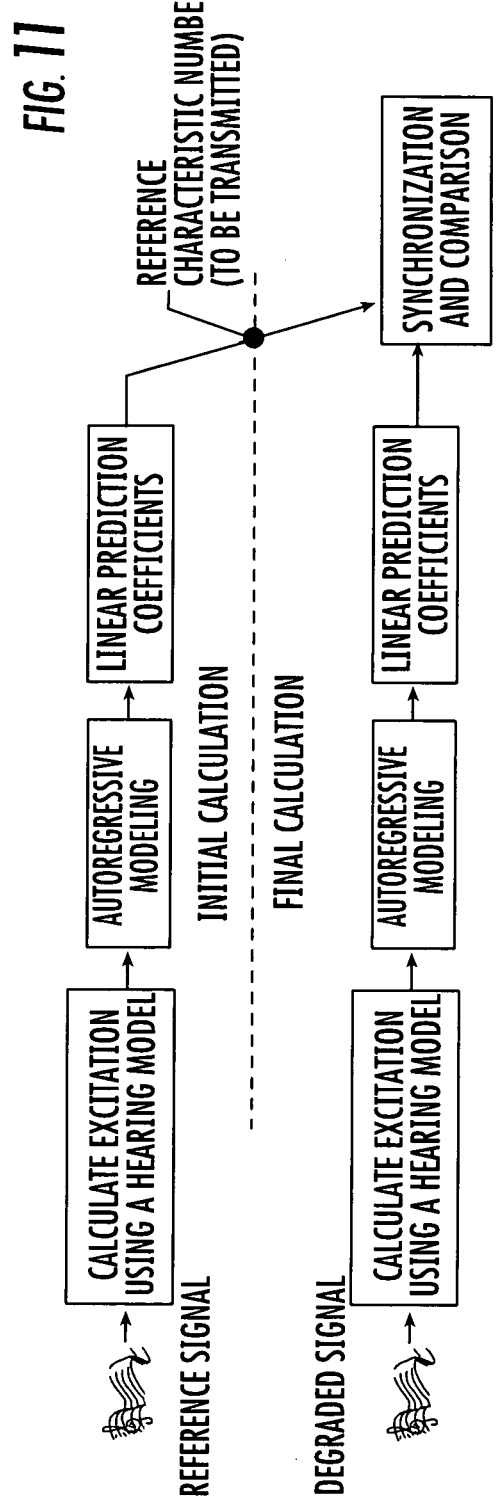
FIG. 11 depicts a use of a method employing autoregressive modeling of the signal with linear prediction coefficients as the characteristic parameter.

The principle of the method may be as summarized in the FIG. 11 diagram.

Modeling psychoacoustic phenomena yields 24 basilar components. The order N of the prediction filter is 32. From these components, 32 autocorrelation coefficients are estimated, yielding 32 prediction coefficients, of which only 5 to 10 are retained as a quality indicator vector, for example the first 5 to 10 coefficients.

The main advantage of this parameter is that it takes account of psychoacoustic phenomena. To this end, it has been necessary to increase the bit rate needed to transfer the reference consisting of 5 or 10 values for 1024 signal samples (21 ms for an audio signal sampled at 48 kHz), that is to say a bit rate of 7.5 to 15 kbit/s.

The characteristic parameter P may generally be any magnitude obtained from the content of the digital signals, for example, in the case of video signals:

the brightness of the image or of an area thereof as given by the continuous coefficients F(0,0) of the discrete cosine transform of the image, or any other transform by blocks, linear and orthogonal, by blocks or global, and/or the contrast of the image or of an area thereof, obtained by applying a Sobel filter, for example, and/or the activity SA of the image as defined, for example, in the Applicant's application PCT WO 99/18736, and obtained by a transformation by blocks linear and orthogonal (discrete cosine transform, Fourier transform, Haar transform, Hadamard transform, slant transform, wavelet transform, etc.), the average of the image, and in the case of audio signals:

the power, and/or the spectral power density as defined in French Patent Application FR 2 769 777 filed 13 Oct. 1997, and/or one of the parameters described above.

It will be noted that the parameter P may be degraded by transmission, but in practice it is found that synchronization may be obtained by the method of the invention at the levels of deterioration generally encountered in transmission networks.

As a general rule, once synchronization has been acquired, the method may be used to verify that it has been retained, in order to be able to remedy disturbances such as bit stream interruptions, changes of bit stream, changes of decoder, etc., as and when required, by desynchronizing the two digital signals E and S.

The method described is applicable whenever it is necessary to synchronize two digital streams. The method yields a first synchronization range that is sufficiently narrow to allow the use of standard real time fine synchronization methods.

The method advantageously exploits one or more parameters characteristic of the signals to be synchronized that are represented by at least two characteristic numbers, instead of all of the signals. In a preferred embodiment, the combined use of a plurality of parameters achieves more reliable synchronization than the prior art techniques. Moreover, the invention achieves synchronization at a chosen level of accuracy and with less complexity than existing methods. This form of synchronization delimits an error range with a duration allowing subsequent use of standard "fine" synchronization methods if higher accuracy is required.

One particular application of measuring equipment for implementing the method of the invention is monitoring the quality of signals delivered by audiovisual digital signal broadcasting networks.

The invention also provides sound and picture synchronization for a data stream incorporating audio and video data. To this end, video synchronization is effected by calculating a video synchronization shift and audio synchronization is effected by calculating an audio synchronization shift. Moreover, it is possible to determine if an offset between the sound and the picture has occurred during transmission by comparing the values of the two shifts, for example.

What is claimed is:

1. A method of synchronizing two digital data streams with the same content, the method comprising the steps of:
    a) generating at given intervals for each of the two digital data streams $S_1$ and $S_2$ at least two characteristic numbers expressing at least one characteristic parameter of their content;
    b) generating from said numbers points $D_1$ and $D_2$ for each of the two streams $S_1$ and $S_2$ representing at least one of said characteristic parameters in a space of at least two dimensions, the points $D_1$ corresponding to the stream $S_1$ and the points $D_2$ corresponding to the stream $S_2$ being situated in a time period T and defining trajectories representative of the data streams $S_1$ and $S_2$ to be synchronized;
    c) shifting the time periods of duration T assigned to the digital data streams $S_1$ and $S_2$ relative to each other by calculating a criterion of superposition of said trajectories having an optimum value representing the required synchronization;
    d) choosing the shift between the time periods corresponding to said optimum value as a value representative of the synchronization.

2. A method according to claim 1, wherein one of the digital data streams is a reference stream $S_1$, the other data stream is a stream $S_2$ received via a transmission system, the numbers characteristic of the reference stream $S_1$ are transmitted therewith, and the numbers characteristic of the received stream $S_2$ are calculated in a receiver.

3. A method according to claim 1, wherein the step c) entails:
    c1) calculating a distance D between a first trajectory represented by the points $D_1$ belonging to a first time period of duration T and a second trajectory represented by the points $D_2$ belonging to a second time period of duration T, said distance D constituting said superposition criterion; and
    c2) shifting said first and second time periods of duration T relative to each other until a minimum value is obtained for the distance D that constitutes said optimum value.

4. A method according to claim 3, wherein the distance D is an arithmetic mean of the distances d between corresponding points $D_1$, $D_2$ of the two trajectories.

5. A method according to claim 4, wherein said distance d between the points is a Euclidean distance.

6. A method according to claim 1, wherein the step c) entails:
    c1) calculating a correlation function between corresponding points $D_1$, $D_2$ of the two trajectories, said correlation function constituting said superposition criterion; and
    c2) shifting the first and second time periods of duration T relative to each other until a minimum value of the correlation function is obtained that constitutes said optimum value.

7. A method according to claim 1, wherein the step c) entails:
    c1) converting each trajectory into a series of angles between successive segments defined by points on the trajectory; and
    c2) shifting the first and second time periods of duration T relative to each other until a minimum value is obtained for the differences between the values of angles obtained for homologous segments of the two trajectories, said minimum value constituting said optimum value.

8. A method according to claim 1, wherein the step c) entails:
c1) converting the two trajectories into a series of areas intercepted by successive segments defined by points on said trajectories, the total intercepted area constituting said superposition criterion; and
c2) shifting the time periods of duration T relative to each other until a minimum value is obtained of said total intercepted area, which minimum value constitutes said optimum value.

9. A method according to claim 1, wherein one of said given intervals is equal to $\Delta$ for one of the data streams $S_1$ and equal to $r<\Delta$ for the other data stream $S_2$.

10. A method according to claim 1, effecting a first synchronization by choosing the same given interval $\Delta$ for the two data streams and then a second synchronization for which the given interval is equal to $\Delta$ for one of the data streams $S_1$ and equal to $r<\Delta$ for the other data stream $S_2$.

11. A method according to claim 1, wherein the generation of said characteristic numbers for a reference audio data stream and for a transmitted audio data stream comprises the following steps:
a) calculating for each time window the spectral power density of the audio stream and applying to it a filter representative of the attenuation of the inner and middle ear to obtain a filtered spectral density;
b) calculating individual excitations from the filtered spectral density using the frequency spreading function in the basilar scale;
c) determining the compressed loudness from said individual excitations using a function modeling the non-linear frequency sensitivity of the ear, to obtain basilar components; and
d) separating the basilar components into n classes, where n is much lower than the number of audio samples in a time window, and preferably into three classes, and calculating for each class a number C representing the sum of the frequencies of that class, there being either n characteristic numbers consisting of a number C or n'<n characteristic numbers generated from said numbers C.

12. A method according to claim 1, wherein the generation of a characteristic number for a reference audio data stream and for a transmitted audio data stream comprises the following steps:
a) calculating N coefficients of a prediction filter by autoregressive modeling; and
b) determining in each time window the maximum value of the residue as the difference between the signal predicted by means of the prediction filter and the audio signal, said maximum prediction residue value constituting one of said characteristic numbers.

13. A method according to claim 1, wherein the generation of said characteristic numbers for a reference audio data stream and for a transmitted audio data stream comprises the following steps:
a) calculating for each time window the spectral power density of the audio stream and applying to it a filter representative of the attenuation of the inner and middle ear to obtain a frequency spreading function in the basilar scale;
b) calculating individual excitations from the frequency spreading function in the basilar scale;
c) obtaining the compressed loudness from said individual excitations using a function modeling the non-linear frequency sensitivity of the ear, to obtain basilar components;
d) calculating from said basilar components prediction coefficients of a prediction filter by autoregressive modeling; and
e) generating at least one characteristic number for each time window from at least one of the prediction coefficients.

14. A method according to claim 13, wherein the characteristic numbers consist of 1 to 10 of said prediction coefficients and preferably 2 to 5 of said coefficients.

15. A method according to claim 1, wherein one of said characteristic numbers is the instantaneous power of an audio signal.

16. A method according to claim 1, wherein one of said characteristic numbers is the spectral power density of an audio signal.

17. A method according to claim 1, wherein one of said characteristic numbers is the bandwidth of an audio signal.

18. A method according to claim 1, wherein one of said characteristic numbers is the continuous coefficient of the transformation by a linear and orthogonal transform of at least one portion of an image belonging to the data stream, said transformation being effected by blocks or globally.

19. A method according to claim 1, wherein one of said characteristic numbers is the contrast of at least one area of an image belonging to the data stream.

20. A method according to claim 1, wherein one of said characteristic numbers is the spatial or temporal activity of at least one area of an image.

21. A method according to claim 1, wherein one of said characteristic numbers is the average brightness of at least one area of an image.

22. A method according to claim 1, wherein said points $D_1$ and $D_2$ are generated from at least two characteristic parameters.

23. A method according to claim 22, wherein said characteristic parameters are audio parameters.

24. A method according to claim 22, wherein said characteristic parameters are video parameters.

25. A method according to claim 1, wherein the data stream comprises a video data stream and an audio data stream and the method effects firstly video synchronization based on points said $D_1$ and $D_2$ associated with at least one characteristic video parameter corresponding to said video stream and secondly audio synchronization based on points $D''1$ and $D''2$ associated with at least one characteristic audio parameter corresponding to said audio stream.

26. A method according to claim 25, including a step of determining the synchronization shift between the video stream and the audio stream as the difference between said shifts determined for the video stream and for the audio stream.

* * * * *